Aug. 14, 1962  I. C. RESENER  3,049,034
TUBE STOCK SIZING APPARATUS
Filed Sept. 30, 1959  6 Sheets-Sheet 3

INVENTOR.
IRVIN C. RESENER.
BY
Lockwood, Woodard, Smith & Weikart.
ATTORNEYS.

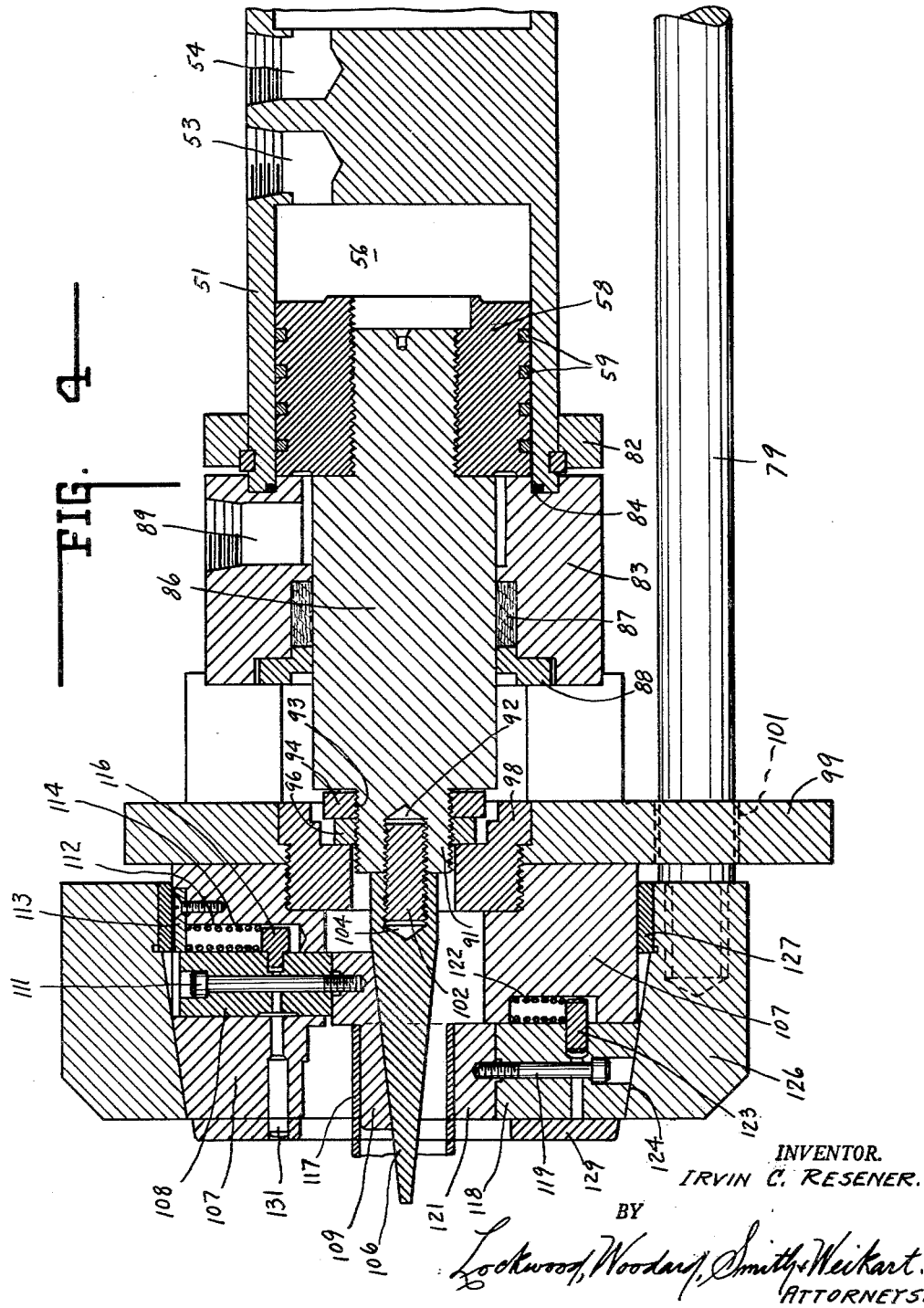

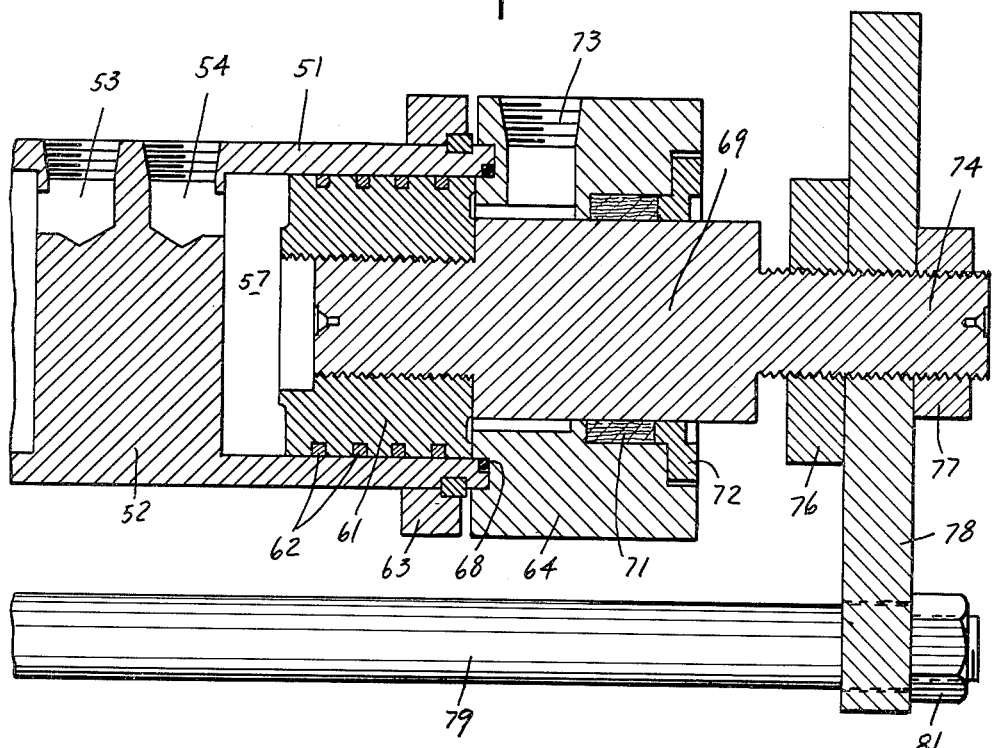
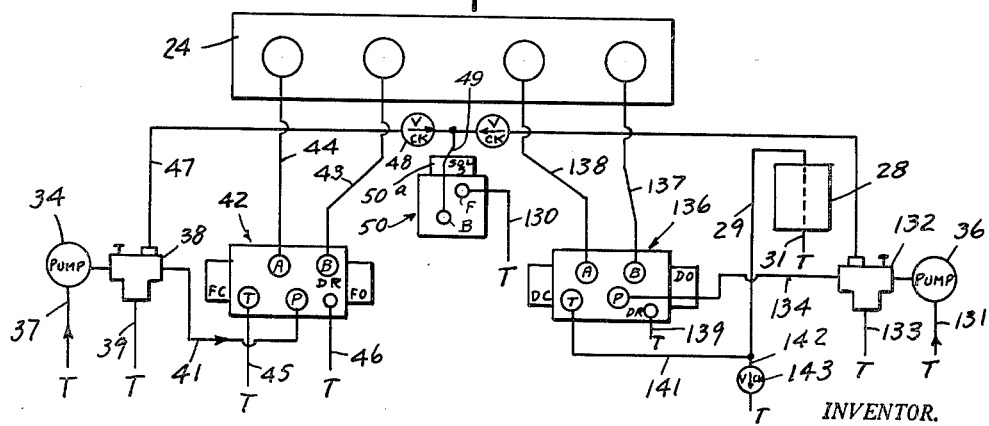

Aug. 14, 1962     I. C. RESENER     3,049,034

TUBE STOCK SIZING APPARATUS

Filed Sept. 30, 1959     6 Sheets-Sheet 6

FIG. 7

INVENTOR.
IRVIN C. RESENER.
BY
Lockwood, Woodard, Smith & Weikart
ATTORNEYS.

3,049,034
Patented Aug. 14, 1962

1

3,049,034
TUBE STOCK SIZING APPARATUS
Irvin C. Resener, Indianapolis, Ind., assignor to Resener Machine & Tool Co., Inc., Indianapolis, Ind., a corporation
Filed Sept. 30, 1959, Ser. No. 843,512
5 Claims. (Cl. 78—14)

This invention relates generally to sizing apparatus for metal parts of relatively thin cross-section and in particular to an apparatus for accurately sizing tube stock.

In the manufacture of products which incorporate relatively thin-walled metal tubing, it is often necessary to use tubing having certain portions sized to close tolerances of the order of .005 inch. Such close tolerances are required, for example, on portions of automobile tail pipes. Applications wherein one portion of a tube must be telescoped into a second tube are further examples requiring close tolerances on the interfitting tube sections.

It is the primary object of the present invention to provide an apparatus for sizing tube stock to close tolerances and which is flexible, as to its control, whereby the apparatus can perform various sizing operations.

A further object of the present invention is to provide a tube sizing apparatus utilizing independently movable finger members and die elements actuated by a dual hydraulic power element.

A further object of the present invention is to provide an apparatus of the type referred to having a flexible control system permitting the sizing operations to be performed automatically in any desired sequence or timing and which further permits the operations to be controlled manually.

These and other objects of the present invention will become apparent as the description proceeds with reference to the accompanying drawings in which:

FIG. 4 is a sectional view taken generally along the line 4—4 of FIG. 3.

FIG. 5 is a sectional view which represents an extension of the sectional view shown in FIG. 4.

FIG. 6 is a schematic diagram of the hydraulic system for operating the apparatus.

FIG. 7 is a schematic wiring diagram of the apparatus.

Figure 1:
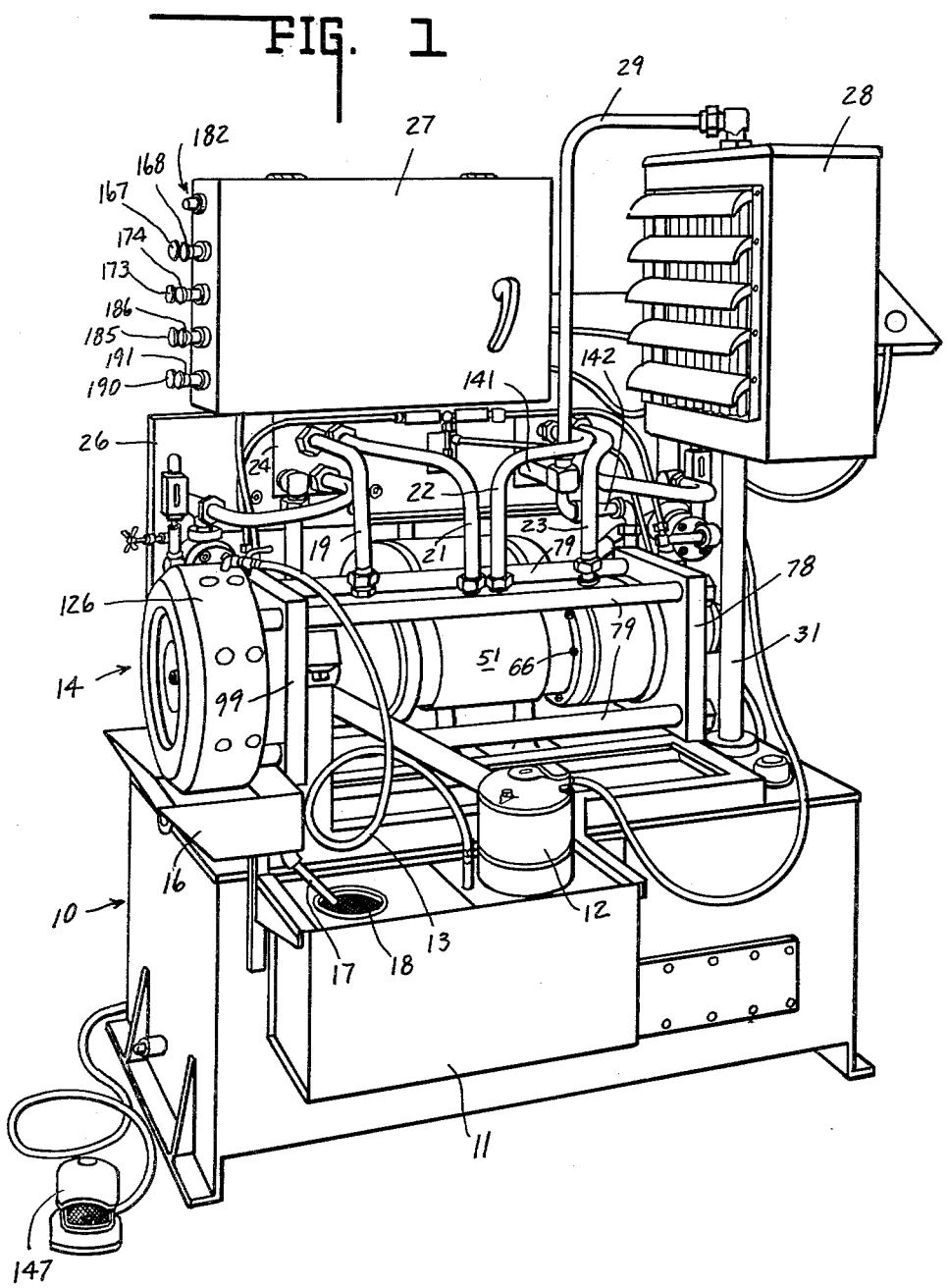
FIG. 1 is a perspective view of apparatus embodying the present invention.
Figure 2:
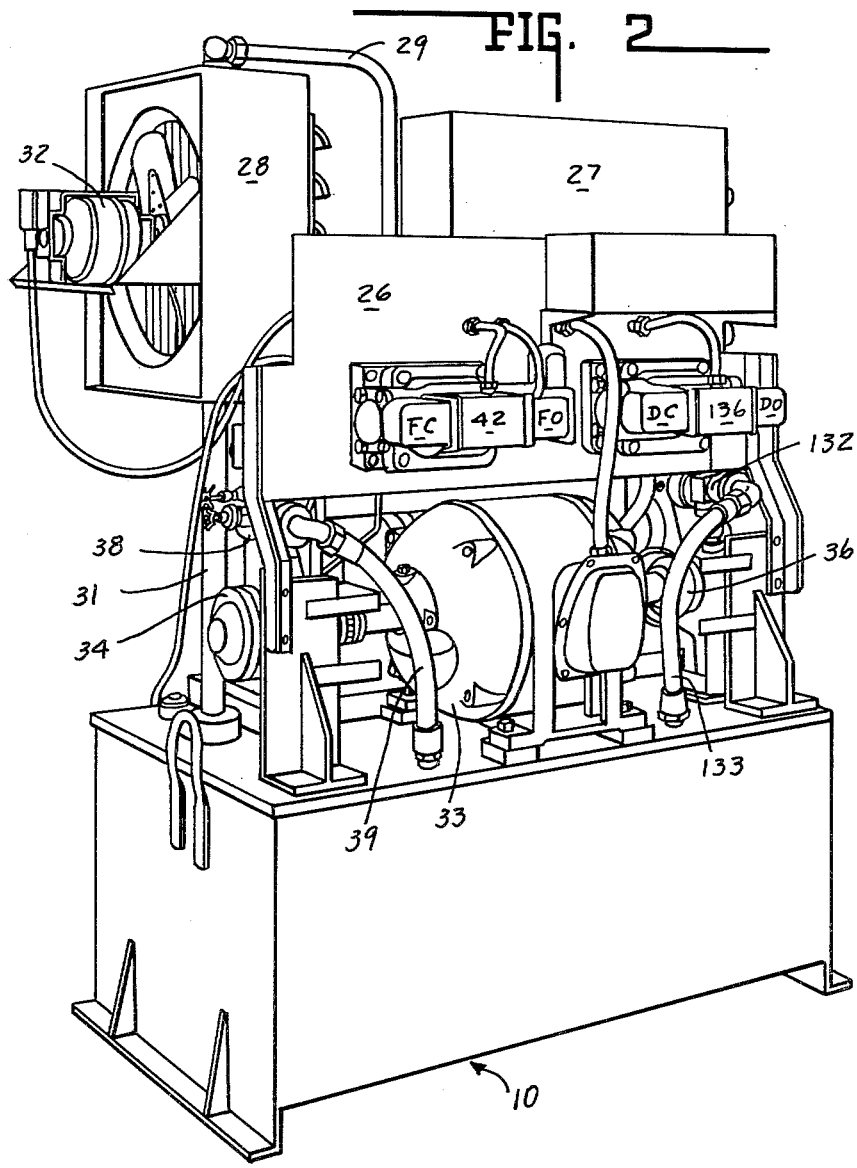
FIG. 2 is a further perspective view but taken from the opposite side of the apparatus.

Referring initially to FIGS. 1 and 2, the reference numeral 10 generally designates a rectangular base or frame which houses a hydraulic fluid reservoir, not shown. Mounted on one side of the tank is an oil reservoir 11 having a flush pump motor 12 supported thereon. The motor serves to pump oil through the line 13 into the stock receiving head, generally designated at 14 and after moving through the head, the flushed oil accumulates in the receptacle 16 and runs through the tube 17 and filter screen 18 back to the oil reservoir 11. Extending from the stock receiving head 14 is a hydraulic cylinder 51. The cylinder serves to actuate certain components of the head 14 as will be explained in detail with reference to FIGS. 3–5. Extending from the cylinder are hydraulic lines 19, 21, 22 and 23. The hydraulic lines extend to a panel 24 and are connected by means of further hydraulic lines to control valves as will be subsequently pointed out with reference to FIG. 6.

Atop the vertically extending plate 26, there is mounted an electrical control box 27 having various push button switches thereon. Adjacent the control box there is mounted a heat exchanger 28 having an input line 29 for conducting hydraulic fluid thereto and an outlet line 31 for returning fluid to the hydraulic fluid reservoir.

As may best be seen in FIG. 1, the heat exchanger is provided with a motor driven fan 32 for moving cooling air therethrough. Mounted beside the hydraulic cylinder 51 is a motor 33 whose shaft operates hydraulic fluid pumps 34 and 36 through suitable couplings. The motor and pumps thus serve to provide hydraulic pressure for the cylinder 51, the pressure being controlled and sequenced by means of the control system to be subsequently described.

Figure 3:
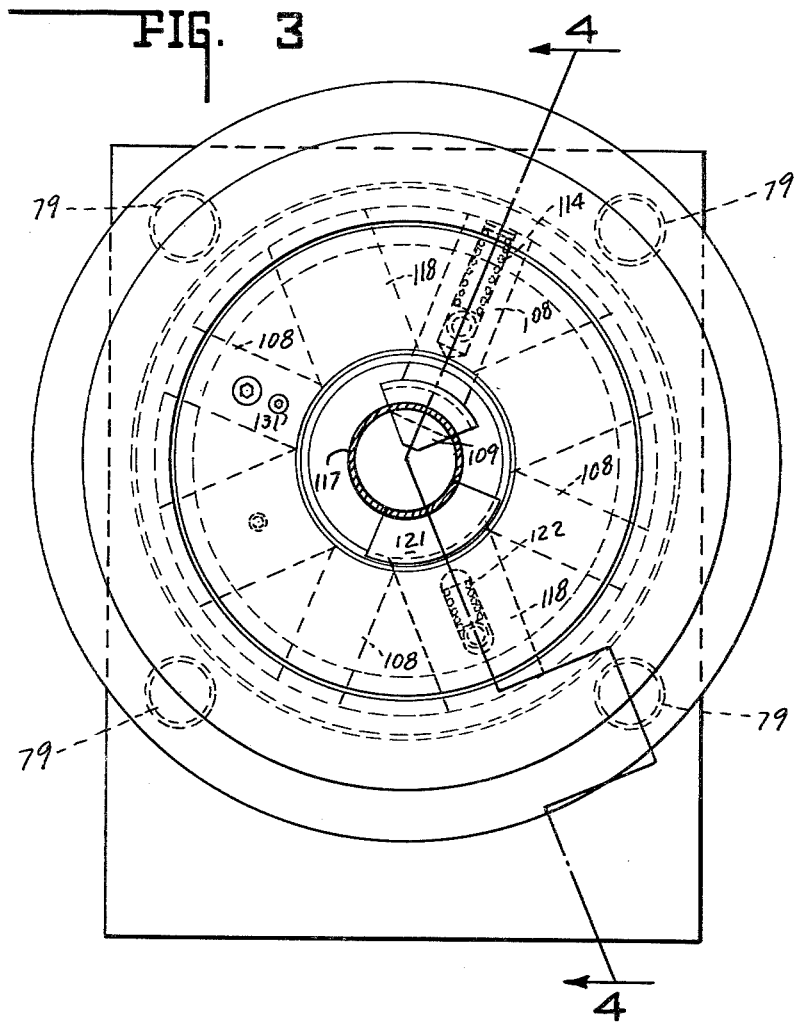
FIG. 3 is an end view of the stock receiving head of the apparatus.

Referring now to FIGS. 3, 4 and 5, the work accommodating head and the hydraulic actuating means therefor will be described. The actuating means includes a cylinder 51, the left-hand portion of the cylinder being shown in FIG. 4 and the right-hand portion thereof being shown in FIG. 5. The cylinder is divided centrally by a wall 52 and the wall is provided with adjacent apertures 53 and 54. The aperture 53 communicates with the cylinder bore 56 and the aperture 54 communicates with the cylinder bore 57 to permit access of hydraulic fluid thereto. Movable within the bore 56 is a piston 58 provided with suitable piston rings 59. The bore 57 accommodates a similar piston 61 provided with piston rings 62. The outer end of the cylinder, shown in FIG. 5, has rigidly secured thereto an annular member 63 and is closed by a member 64 having a central aperture therein. The member 64 is rigidly held in sealed relation to the end of the cylinder by means of screws 66 (FIG. 1), the annular seal 68 providing a fluid-tight junction.

A piston shaft 69 has a reduced end threaded into and thereby rigidly secured to the piston 61. The shaft 69 extends through the central aperture in the member 64 and is movable therein, a hydraulic seal 71 and a bronze bushing 72 being provided therefor. An aperture 73 in the member 64 communicates with the area surrounding the central section of the shaft 69 and provides access for hydraulic fluid to the rear face of the piston 61. The reduced outer end 74 of the shaft 69 is threaded to accommodate locking nuts 76 and 77 which fix the position of a plate 78 upon the shaft. The plate 77 is rectangular in configuration and is provided with apertures adjacent its corners to accommodate thrust rods 79, the rods being secured to the plate 78 by means of nuts 81. While only one of the rods 79 is shown in FIG. 5 for purposes of clarity, the general disposition of the rods will be apparent from FIG. 1. From the foregoing, it will be apparent that by controlling the hydraulic pressure on opposite sides of the piston 61, the plate 78, and consequently the thrust rods 79, may be positionally controlled.

Referring now to FIG. 4, it may be seen that the opposite end of the cylinder 51 is provided with an annular member 82 which receives machine screws similar to screws 66 of FIG. 1, the screws serving to mount and seal the member 83 upon the open end of the cylinder. The sealing member 84 is a counterpart of the seal 68 in FIG. 5. The piston 58 is rigidly attached to a reduced end of the piston shaft 86 which extends through a central aperture in the member 83 and cooperates with the hydraulic seal 87 and the bronze bushing 88. The member 83 is provided with an aperture 89 which communicates with the area adjacent the enlarged central portion of the piston 86 and provides for access of hydraulic fluid to the rear face of the piston 58.

The outer end of the shaft 86 is reduced, as indicated at 91 and is provided with a tapped bore 92 and external threads 93. The externally threaded end of the shaft accommodates nuts 94 and 96 which may be adjustably positioned and locked along the reduced end 91 of the shaft. The nut 96 is adapted to engage an internal shoulder 97 formed in a stop member 98 rigidly mounted in a central opening in a stationary plate 99. Plate 99 is provided with apertures 101 which freely accommodate the thrust rods 79. It will be evident from FIG. 4, that by controlling the hydraulic pressures on the opposite faces of the piston 59, the position of shaft 86 may be controlled. Engagement of the nut 96 with the stop member 98 serves to establish the outer limit of the movement of the shaft 86, this limit being adjustable for positioning of the nut 96 on the reduced end portion of the shaft.

The head for accommodating the work or tube stock will now be described with reference to FIGS. 3 and 4. The bore 92 in the shaft 86 accommodates an externally threaded member 102 which is also threaded into an axial aperture 104 in a tapered mandrel 106. The mandrel 106 is thus rigidly attached to and movable with the shaft 86. Threaded upon the stop member 98 is a stationary annular member 107. As may best be seen in the upper portion of FIG. 4, the annular member 107 is provided with a series of equally spaced, radial apertures, each of which slidably accommodates a pin 108. The inner ends of the pins are each provided with forwardly projecting fingers or abor members 109, the members 109 being joined to the pins 108 by means of machine screws 111. The stationary member 107 is provided with a radial aperture 112 adjacent each of the pins, the apertures being closed by plates 113. Compression springs 114 are disposed within the apertures 112 and at their upper ends bear against the plates 113 and, at their lower ends, bottom against members 116 which are carried by the pins 108. It will thus be evident that the arbor members 109 are biased toward the axial center line of the head by the springs 114 and are moved upwardly by engagement with the tapered mandrel 106. With a section of tube stock, indicated at 117, disposed over the arbor members, these members will be urged against the inner circumference of the tube stock in proportion to the positioning of the mandrel 106. For purposes of clarity, only one of the arbor members 109 is shown in FIG. 3, although it will be understood that a plurality of these members is carried by the member 107.

The stationary member 107 is further provided with an additional series of equally spaced radial apertures slidably accommodating pins 118. Machine screws 119 serve to attach to the pins arcuately shaped die heads 121 which engage the outer surface of the tube stock 117. Adjacent each of the pins 118, the stationary member 107 is formed so as to accommodate compression springs 122 which bear against sidewardly extending members 123 carried by the pins 118. The pins 118 are thus urged radially outwardly from the axial center line of the assembly by the springs 122. For purposes of clarity, only one of the die heads 121 is shown in FIG. 3, although it will be understood that a plurality of these elements is carried by the member 107.

At their outer ends the pins 118 are provided with inclined faces which are slidably engaged by the inner tapered wall 124 of an outer, annular member 126. The member 126 is provided with a bronze bearing ring or bushing 127 and receives the threaded ends of the thrust rods 79. A front ring 128 attached to the face of the stationary member 107 by means of machine screws 131 completes the assembly.

As shown in FIGS. 4 and 5, the piston 61, and consequently the annular member 126, are in their extreme rightward or retracted position, and the pins 118 are thereby disposed in their maximum inward positions and against the tube stock 117. Shifting of the position of the piston 61 leftwardly, as view in FIG. 5, serves to correspondingly shift the position of the member 126 to permit the die members 121 to withdraw from the stock. Similarly, application of hydraulic pressure to the leftward face of the piston 58 will shift the mandrel 106 from its extreme leftward position of FIG. 4. Such shifting of the mandrel permits the arbor members 109 to retreat from the inner circumference of the tube stock 117.

Referring now to FIG. 6, the hydraulic system will be described. In FIG. 6, the hydraulic lines which terminate at the hydraulic fluid reservoir are marked with a T. The tube 37 connects the input side of the pump 34 with the hydraulic fluid reservoir. The output side of the pump is connected to a manually adjusted valve 38 which serves to determine the hydraulic pressure available for the cylinder 51. The valve 38 is of conventional type and has a return line 39 to the reservoir. One output line 41 from the valve 38 is connected to the common side P of a directional valve indicated at 42. The directional valve is of a conventional type and is provided with solenoids FO and FC. The operation of the valve is such that with the solenoid FO energized, the pressurized line 41 will be connected to the line 43 which is connected to the fitting B on the valve. The valve is constructed so that even though the solenoid FO is only momentarily energized, the lines 41 and 43 will remain connected until the opposite solenoid FC is momentarily energized. When this occurs, the line 41 will then be connected to the hydraulic line 44 which is connected to the valve at the fitting B. The valve 42 is of conventional type such as manufactured by Vickers, Inc., model D–6554. The hydraulic line 44 is connected through the panel 24 to the tube 19 (FIG. 1) which communicates with the aperture 89 in the hydraulic cylinder as may be seen in FIG. 4. The line 43 is connected through the panel 24 to the tube 21 (FIG. 1) which communicates with the aperture 53 (FIG. 4) of the hydraulic cylinder. The valve 42 is also provided with a drain line 46 to the hydraulic reservoir or tank and is provided with a return line 45 to the tank.

A secondary output line 47 extends from the valve 38 to a check-valve 48, the output side of the check-valve being connected by means of a line 49 to a solenoid valve 50, the line 49 being connected to the fitting B on the valve. The valve 50 is a conventional solenoid operated valve such as manufactured by Vickers, Inc., model D–6484, and has a solenoid operator indicated schematically at 50a. The output side of the valve communicates through the valve fitting F with a line 130 which leads to the hydraulic fluid reservoir or tank. Thus, when the solenoid 50a is energized, the hydraulic fluid will be bypassed to the reservoir.

An input line 131 leads from the tank to the pump 36, the output line from the pump communicating with a manually operated valve 132 which is identical to the valve 38. The valve is provided with a return line 133 to the tank and with an output line 134 which is connected to the fitting P on a control valve 136 which is identical to the valve 42. The line 134 is thus connected to the common side of the valve 136. When the solenoid operator DO is energized, communication will be established by the line 134 and a line 137 connected to the fitting B of the valve. Similarly when the solenoid D.C. is energized, communication will be established between the line 134 and a line 138 which is connected to the fitting A on the valve. The valve is provided with a drain line 139 to the tank and with a return line to the tank indicated at 141. The line 137 is connected through the panel 24 to the tube 23 (FIG. 1) which communicates with the aperture 73 (FIG. 5) of the hydraulic cylinder. The line 138 communicates through the panel 24 with the tube 22 (FIG. 1) which, in turn, communicates with the aperture 54 of FIG. 5. The line 141 communicates with the line 29 to the heat exchange unit or cooler 28 and hydraulic fluid returns to the tank through the line 31. A line 142 extends from the junction of 141 and 29, through a check-valve 143 to the tank.

The electrical circuit for controlling the valves 42, 50 and 136 will now be described with reference to FIG. 7. The electrical components, housed in the control box 27, include a terminal board 146 having terminals 201—212 thereon. Terminal 201 is connected to solenoid operator D.C. and terminal 202 is connected to solenoid FO. Terminals 203 and 204 are connected to the solenoids FC and DO respectively. Terminal 205 is connected to solenoid 50a. The opposite sides of the solenoids are connected in common to the terminal 212. The terminals 206 and 207 are connected to a foot operated switch indicated at 147 in FIGS. 1 and 7. Terminals 208, 209 and 210 are connected to the heat exchange fan motor 32 and the flush pump motor 12, the motors being connected in parallel.

Wires 148, 149 and 151 extend from a 220 volt three-phase power supply (not shown) and are connected through a suitable circuit breaker 152 to the lines 153, 154 and 156, respectively. These last mentioned wires extend through suitable fuse to a conventional magnetic starter 157 for the motors 32 and 12. Lines 158, 159, and 161 connect wires 153, 154 and 156 to a conventional magnetic starter 162 for the hydraulic pump motor 33. The magnetic starter 162 is connected by means of wires 163, 164 and 166 to a start push button switch 167 and to a stop push button switch 168, the switches 167 and 168 being of conventional type and functioning when manually actuated to start and stop the motor 33. The magnetic starter 157 is also connected by means of wires 169, 171 and 172 to a push button start switch 173 and a push button stop switch 174, the switches 173 and 174 being of a conventional type and functioning to start and stop the motors 12 and 32 when manually actuated.

Wires 176 and 177 provide 220 volt single-phase power to the primary coil of a step-down transformer 178. The 110 volt output of the transformer is connected through a fuse 179 to the terminals 211 and 212. A wire 181 connects the terminal 211 to one side of a three-positioned switch 182. The switch 182 is shown in "automatic" position, that is, a position in which the switch contacts on the right-hand side of the schematic showing of the switch are bridged and the contacts on the left-hand side are open or unbridged. The switch may also be moved to "off" which is the intermediate position wherein none of the switch contacts are bridged. The switch may also be moved to manual position in which the switch contacts on the left are bridged and those on the right are unbridged or open.

The wire 181 is connected through one of the sets of switch contacts bridged when the switch 182 is in "manual" position to a wire 183. A wire 184 connects the wire 183 to one side of a manual push button switch 185 and to one side of another manual push button switch 186. The switches 185 and 186 are shown in deactuated position and, when their push buttons are actuated, their contacts are bridged to provide electrical continuity to wires 187 and 188, respectively, wire 187 being connected to terminal 201 and wire 188 being connected to terminal 202. Wire 189 serves to connect the wire 183 to one side of each of the manually operated push button switches 190 and 191, the other side of the switches being connected by means of wires 192 and 193 to terminals 204 and 203 respectively.

A motor operated rotary switch indicated at 194 controls the operational sequence of the solenoids and includes a motor 195 connected across the terminals 207 and 212. Upon energization of the motor, its shaft is rotated to initially close the hold-in switch 300 and to thereafter close momentarily each of the switches 301—308. The common side of the switches 300—308 is connected to the terminal 206. The opposite side of switch 300 is connected with the motor 195 to terminal 207. Switches 301 and 305 are connected to terminal 201. Switches 302 and 306 are connected to the terminal 202. Switches 303 and 307 are connected to the terminal 203. Switches 304 and 308 are connected to the terminal 204. It will be understood that the rotary switch is of a conventional type which permits convenient alteration of the switching sequence and the duration of the time lapse between actuation of the respective switches to provide a flexible control cycle.

In operation, with the switch 182 in "automatic" position as shown in FIG. 7, depressing the foot switch 147 provides a circuit for the rotary switch motor 195 through the power terminal 212 and through terminal 207, through the foot switch 147, terminal 206, switch 182 and through wire 181 and terminal 211 to the other side of the secondary winding of the transformer 178. Initial rotation of the motor 195 closes switch 300 which locks in the motor independently of the circuit through the foot switch 147. Subsequent rotation of the motor 195 momentarily closes switch 301 which through terminal 201 energizes solenoid operator DC on the control valve 136. Energization of solenoid DC provides hydraulic fluid pressure in the aperture 54 (FIG. 5) of the hydraulic cylinder and connects the aperture 73 (FIG. 5) of the hydraulic cylinder to the oil reservoirs. Hydraulic pressure is thus applied to the leftward face of the piston 61 (FIG. 5) to move the rods 79 and consequently the annular member 126 rightwardly, as viewed in FIG. 4. This motion of the annular member 126 serves to drive the die heads 121 inwardly toward the axis of the annular member and against the outer surface of the tube stock 117.

Further rotation of the rotary switch motor 195 serves to momentarily close the switch 302, which, through terminal 202 energizes the solenoid operator FO of the control valve 42 (FIG. 6). Energization of solenoid FO causes hydraulic pressure to appear at aperture 53 (FIG. 4) of the hydraulic cylinder, and to connect aperture 89 of the cylinder to the return line to the hydraulic fluid reservoir. The piston 58 (FIG. 4) is thus driven leftwardly as viewed in FIG. 4 to move the fingers 109 outwardly away from the axis of the annular member and into engagement with the inner surface of the tube stock 117. Further rotation of the rotary switch motor 195 serves to momentarily close the switch 303, which, through the terminal 203, serves to energize the solenoid operator FC of the control valve 42. Energization of the solenoid FC shifts the position of valve 42 so that hydraulic pressure is present at aperture 89 (FIG. 4) and aperture 53 (FIG. 4) is relieved of hydraulic pressure. This causes the piston 58 of the hydraulic cylinder to move rightwardly as viewed in FIG. 4, to retract or close the fingers 109, moving the fingers away from the tube stock 117. Further rotation of the motor 195 of the rotary switch 194 momentarily closes switch 304 which, through terminal 204 serves to energize the solenoid operator DO of the control valve 136 (FIG. 6). Energization of the solenoid DO shifts the position of valve 136 so that hydraulic pressure is present in aperture 73 (FIG. 5) of the hydraulic cylinder and aperture 54 is relieved of pressure by connection to the hydraulic fluid reservoir. This causes the piston 61 to move leftwardly from its position shown in FIG. 5. This motion of the piston moves the rods 79 and consequently the annular member 126 leftwardly as viewed in FIG. 4 to permit the die heads 121 to open or move away from the tube stock 117.

Further rotation of the rotary switch motor 195 sequentially close switches 305–308 to again repeat the closing and opening motions of the die heads 121 and fingers 109.

A wire 180 connects terminal 207 to one set of switch contacts of the switch 182 and with the switch 182 closed, this set of contacts provides electrical continuity to terminal 205. Whenever the foot switch 147 is closed, an energization circuit is thus provided for solenoid operator 50a of the control valve 50, the subsequent closure of holding switch 300 by the rotary switch motor 195 serving to hold the solenoid 50a energized for the period during which the motor 195 is operating. When solenoid 50a is energized, control valve 50 is shifted to a position such that the by-pass line 130 (FIG. 6) to the hydraulic reservoir is blocked. This places full hydraulic pressure on the hydraulic cylinder as determined by the positions of the control valves 42 and 136. As soon as the rotary switch has completed a cycle, the motor 195 will re-open the holding switch 300, shutting down the rotary switch motor and breaking the circuit to solenoid 50a. De-energization of solenoid 50a opens the valve 50, and hydraulic fluid is vented through the valves 38 and 132, to the valve 50 and through the line 130 to the hydraulic reservoir. The stand-by hydraulic pressure in the system is thus held to a greatly reduced value such as 65 pounds per square inch, for example, and full hydraulic pressure is not placed on the system unless the solenoid 50a is energized.

When the apparatus is to be operated manually rather than automatically, the switch 182 may be moved to "manual" position, thereby breaking the circuit to the foot switch 147 and closing the circuit between wire 181 and wire 183 and also closing a circuit between wire 181 and terminal 205. Closure of the circuit from wire 181 to terminal 205 serves to energize the solenoid operator 50a for the control valve 50 of FIG. 6. Energization of the solenoid 50a closes the by-pass line to the fluid reservoir and places full hydraulic pressure on the system, assuming that the start button of switch 167 has been actuated. The position of the hydraulic cylinder pistons and consequently the positions of the die face and fingers may then be manually controlled by means of push button switches 185, 186, 190 and 191.

From the foregoing, it will be apparent that the apparatus of the present invention can be controlled either manually or automatically for sizing tube stock and its operating cycle is characterized by flexibility in sequencing and timing. The work contacting elements can, of course, be replaced for accommodating stock of differing sizes.

While the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:

1. A tube stock sizing apparatus comprising a stationary annular member, a plurality of spaced finger members supported by said annular member for movement toward and away from the central axis of the annular member and spring biased toward said axis, said finger members extending parallel to the annular member axis with their outer surfaces being adapted to engage the inner bore of a section of tube stock to be sized, the inner surfaces of said finger members being inclined, a tapered spindle extending centrally through said finger members and engaging the inclined inner surfaces thereof, said spindle being movable along the axis of said annular member to displace said finger elements outwardly therefrom and into engagement with the tube stock, a plurality of spaced die elements supported by said annular member for movement toward and away from the central axis of the annular member and spring biased away from said axis, the inner surfaces of said die elements being adapted to engage the outer surface of a section of tube stock to be sized, the outer surfaces of said die elements being inclined, a ring member encircling said annular member and having an inclined inner surface engaging the inclined outer surfaces of said die elements, said ring member being movable along the axis of said annular member to displace said die elements inwardly toward said axis and into engagement with the tube stock, and means for moving said spindle and said ring member independently of each other, said means comprising a hydraulic cylinder centrally divided into a first and second working chamber and mounted coaxially with said stationary annular member, a piston in said first chamber having an operative connection to said spindle, a piston in said second chamber having an operative connection to said ring member, and hydraulic control means for sequentially pressuring said chambers for positioning said finger members and die elements.

2. A tube stock sizing apparatus comprising a stationary annular member, a plurality of spaced finger members supported by said annular member for movement toward and away from the central axis of the annular member, said finger members extending parallel to the annular member axis with their outer surfaces being adapted to engage the inner bore of a section of tube stock to be sized, the inner surfaces of said finger members being inclined, a spindle element extending through said finger members and engaging the inclined inner surfaces thereof, said spindle element being movable along the axis of said annular member to displace said finger elements outwardly therefrom and into engagement with the tube stock, a plurality of spaced die elements supported by said annular member for movement toward and away from the central axis of the annular member, the inner surfaces of said die elements being adapted to engage the outer surface of a section of tube stock to be sized, the outer surfaces of said die elements being inclined, a ring member encircling said annular member and adapted to engage the inclined outer surfaces of said die elements, said ring member being movable along the axis of said annular member to displace said die elements inwardly toward said axis and into engagement with the tube stock, and means for moving said spindle element and said ring member independently of each other, said means comprising a hydraulic cylinder centrally divided into a first and second working chamber and mounted coaxially with said stationary annular member, a piston in said first chamber having an operative connection to said spindle element, a piston in said second chamber having an operative connection to said ring member, and hydraulic control means for sequentlly pressuring said chambers for positioning said finger members and die elements.

3. A tube stock sizing apparatus comprising a stationary annular member, a plurality of spaced finger members supported by said annular member for movement toward and away from the central axis of the annular member and spring biased toward said axis, said finger members extending parallel to the annular member axis with their outer surfaces being adapted to engage the inner bore of a section of tube stock to be sized, the inner surfaces of said finger members being inclined, a tapered spindle extending centrally through said finger members and engaging the inclined inner surfaces thereof, said spindle being movable along the axis of said annular member to displace said finger elements outwardly therefrom and into engagement with the tube stock, a plurality of spaced die elements supported by said annular member for movement toward and away from the central axis of the annular member and spring biased away from said axis, the inner surfaces of said die elements being adapted to engage the outer surface of a section of tube stock to be sized, the outer surfaces of said die elements being inclined, a ring member encircling said annular member and having an inclined inner surface engaging the inclined outer surfaces of said die elements, said ring member being movable along the axis of said annular member to displace said die elements inwardly toward said axis and into engagement with the tube stock, and means for moving said spindle and said ring member independently of each other.

4. A tube stock sizing apparatus comprising a stationary annular member, a plurality of spaced finger members supported by said annular member for movement toward and away from the central axis of the annular member, said finger members extending parallel to the annular member axis with their outer surfaces being adapted to engage the inner bore of a section of tube stock to be sized, the inner surfaces of said finger members being inclined, a spindle element extending centrally through said finger members and engaging the inclined inner surfaces thereof, said spindle element being movable along the axis of said annular member to displace said finger elements outwardly therefrom and into engagement with the tube stock, a plurality of spaced die elements supported by said annular member for movement toward and away from the central axis of the annular member, the inner surfaces of said die elements being adapted to engage the outer surface of a section of tube stock to be sized, the outer surfaces of said die elements being inclined, a ring member encircling said annular member and adapted to engage the inclined outer surfaces of said die elements, said ring member being movable along the axis of said annular member to displace said die elements inwardly toward said axis and into engagement with the tube stock, and means for moving said spindle element and said ring member independently of each other.

5. A tube stock sizing apparatus comprising a stationary annular member, a plurality of spaced finger members supported by said annular member for movement toward and away from the central axis of the annular member, said finger members extending parallel to the annular member axis with their outer surfaces being adapted to engage the inner bore of a section of tube stock to be sized, the inner surfaces of said finger members being inclined, a tapered spindle element extending centrally through said finger members and engaging the inclined inner surfaces thereof, said spindle element being movable along the axis of said annular member to displace said finger elements outwardly therefrom and into engagement with the tube stock, a plurality of spaced die elements supported by said annular member for movement toward and away from the central axis of the annular member, the inner surfaces of said die elements being adapted to engage the outer surface of a section of tube stock to be sized, the outer surfaces of said die elements being inclined, a ring member encircling said annular member and adapted to engage the inclined outer surfaces of said die elements, said ring member being movable along the axis of said annular member to displace said die elements inwardly toward said axis and into engagement with the tube stock, and means for moving said spindle element and said ring member independently of each other, said means comprising a dual hydraulic cylinder, and hydraulic control means for pressuring said cylinder for positioning said finger members and die elements.

References Cited in the file of this patent

UNITED STATES PATENTS

| | | |
|---|---|---|
| 1,556,892 | Ahlers | Oct. 13, 1925 |
| 2,394,841 | Bugg | Feb. 12, 1946 |
| 2,557,722 | Brauchler | June 19, 1951 |
| 2,586,943 | Haller | Feb. 26, 1952 |
| 2,644,999 | Hill | July 14, 1953 |
| 2,691,906 | Finch | Oct. 19, 1954 |
| 2,697,581 | Ray | Dec. 21, 1954 |
| 2,711,659 | Foster | June 28, 1955 |
| 2,732,738 | Krause | Jan. 31, 1956 |
| 2,828,538 | Darden | Apr. 1, 1958 |